(12) United States Patent
Ishii et al.

(10) Patent No.: US 12,306,979 B2
(45) Date of Patent: May 20, 2025

(54) INFORMATION MANAGEMENT SYSTEM AND INFORMATION MANAGEMENT METHOD

(71) Applicant: TOYOTA JIDOSHA KABUSHIKI KAISHA, Toyota (JP)

(72) Inventors: Masahiko Ishii, Okazaki (JP); Hidetaka Asano, Nisshin (JP); Akiko Tamura, Nisshin (JP); Koji Hetsugi, Toyota (JP); Ryota Suzuki, Ikeda (JP); Keiichi Koga, Narashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 18/130,963

(22) Filed: Apr. 5, 2023

(65) Prior Publication Data
US 2023/0342484 A1    Oct. 26, 2023

(30) Foreign Application Priority Data
Apr. 21, 2022   (JP) ................................ 2022-070098

(51) Int. Cl.
*H04L 9/00*   (2022.01)
*G06F 16/182*   (2019.01)
*G06F 16/23*   (2019.01)
*G06F 21/62*   (2013.01)

(52) U.S. Cl.
CPC ........ *G06F 21/6218* (2013.01); *G06F 16/182* (2019.01)

(58) Field of Classification Search
None
See application file for complete search history.

(56) References Cited

U.S. PATENT DOCUMENTS 11,991,284 B1 *   5/2024   Ghabel ............ G06K 19/06037
12,182,742 B1 *   12/2024   Clark .................. G06Q 30/018
(Continued)

FOREIGN PATENT DOCUMENTS

JP    2009-070257 A    4/2009

OTHER PUBLICATIONS

Secure Blockchain and AI-Based Decision Making For Chemical Supply Chain Management. Mitra. IEEE. (Year: 2024).*
(Continued)

*Primary Examiner* — Venkat Perungavoor
(74) *Attorney, Agent, or Firm* — Oliff PLC

(57) ABSTRACT

An information management system includes information management apparatuses belonging to A to D companies, respectively, and a platform provider. When a new chemical substance is added as a result of revision of laws and regulations etc. to chemical substances designated under the laws and regulations, the platform provider updates a restriction list and transmits transaction data that proposes update of restriction lists in distributed ledgers to the information management apparatuses. Each of the information management apparatuses approves the transaction data and updates the restriction list thereof. Each of the information management apparatuses discloses information on a chemical substance included in the updated restriction list to an information management apparatus in a downstream company.

8 Claims, 7 Drawing Sheets

(56) References Cited

U.S. PATENT DOCUMENTS

| | | | | |
|---|---|---|---|---|
| 2002/0178077 | A1* | 11/2002 | Katz | G06Q 10/10 |
| | | | | 705/7.36 |
| 2003/0033179 | A1* | 2/2003 | Katz | G06Q 10/0631 |
| | | | | 705/7.41 |
| 2020/0019923 | A1* | 1/2020 | Santhar | G06Q 10/087 |
| 2021/0334876 | A1* | 10/2021 | Trim | G06Q 30/0627 |
| 2024/0045406 | A1* | 2/2024 | Goodwin | G06Q 50/04 |

OTHER PUBLICATIONS

Textile and Apparel Supply Chain with Distributed Ledger Technology (DLT). Lam. IEEE. (Year: 2019).*
The Role of Blockchain Technology on Supply Chain Finance. Yuyan. ACM. (Year: 2020).*
Crawford et al., "California Oilfield Underground Aquifer Injection Monitoring by Blockchain Technology," 2021 4th IEEE International Conference on Industrial Cyber-Physical Systems (ICPS), May 10, 2021, pp. 283-288.
Takhar et al., "Blockchain Application in Supply Chain Chemical Substance Reporting," 22nd Cambridge International Manufacturing Symposium University of Cambridge, Sep. 27-28, 2018, pp. 1-21. Retrieved from the Internet: URL: https://www.repository.com.ac.uk/bitstream/handle/1810/284351/4_-blockchain_applicaiton_in_supply_chain_chemical_substance_reporting.pdf?sequence=1&isAllowed=y>.

* cited by examiner

INFORMATION MANAGEMENT SYSTEM AND INFORMATION MANAGEMENT METHOD

This nonprovisional application is based on Japanese Patent Application No. 2022-070098 filed with the Japan Patent Office on Apr. 21, 2022, the entire contents of which are hereby incorporated by reference.

BACKGROUND

Field

The present disclosure relates to an information management system that manages information based on a distributed ledger technology and an information management method of managing information based on a distributed ledger technology.

Description of the Background Art

Japanese Patent Laying-Open No. 2009-70257 discloses an information management system. This information management system manages information on a chemical substance contained in a component traded in a supply chain including an end product manufacturer and a supplier that supplies a component to the end product manufacturer. The information management system is connected to a supplier terminal used by the supplier and another supplier terminal used by another supplier over a network. Another supplier supplies the supplier with a component included in an assembly delivered by the supplier to the end product manufacturer. The supplier requests another supplier to disclose information on a chemical substance contained in the component for reporting information on the chemical substance contained in the assembly to the end product manufacturer.

SUMMARY

When a chemical substance to be restricted is newly designated as a result of revision of laws and regulations etc., an upstream company is assumed to disclose information on the newly designated chemical substance to a downstream company in a supply chain. In connection with this disclosure, a plurality of types of processing are performed in the upstream company and the downstream company. In the downstream company, for example, processing for monitoring revision of laws and regulations etc. and processing for requesting the upstream company to disclose information on the newly designated chemical substance are performed. In the upstream company, for example, processing for monitoring revision of the laws and regulations etc., processing for considering reasonability of a request for disclosure from the downstream company, and processing for responding to the request for disclosure from the downstream company are performed. Typically, such processing is manually performed by a person in charge of the processing or the like. Consequently, much cost and many man-hours are required for addressing revision of the laws and regulations etc. Then, construction of a scheme that facilitates addressing revision of the laws and regulations has been desired.

The present disclosure was made to solve the problem above, and an object of the present disclosure is to provide a scheme that facilitates addressing revision of laws and regulations that regulate a chemical substance in a supply chain.

(1) An information management system according to one aspect of the present disclosure is an information management system that manages information on a chemical substance contained in a product distributed in a supply chain based on a distributed ledger technology. The information management system includes a management apparatus that manages the information management system, the management apparatus including a first distributed ledger including a list that shows a chemical substance managed in the information management system, and a first apparatus that belongs to a company included in the supply chain, the first apparatus including a second distributed ledger including the list. The chemical substance included in the list refers to a chemical substance designated under laws and regulations. When a new chemical substance is designated under the laws and regulations, the management apparatus adds the designated chemical substance to the list in the first distributed ledger to update the list in the first distributed ledger, and transmits to the first apparatus, first transaction data that proposes addition of the designated chemical substance and update of the list in the second distributed ledger. The first apparatus updates the list in the second distributed ledger based on the first transaction data, and transmits to a second apparatus that belongs to a downstream company in the supply chain, second transaction data including information on the designated chemical substance contained in a product supplied to the downstream company and included in the list in the second distributed ledger.

According to the configuration, when a new chemical substance is designated under the laws and regulations, the management apparatus updates the list in the first distributed ledger and then transmits first transaction data that proposes update of the list in the second distributed ledger to the first apparatus. In other words, the management apparatus monitors revision of the laws and regulations and updates and manages the list in response to revision of the laws and regulations (designation of the new chemical substance). Therefore, the first apparatus does not have to monitor revision of the laws and regulations. In addition, since the management apparatus which is a manager of the information management system manages the list, high reliability of the list can be maintained. Furthermore, since the list is managed based on the distributed ledger technology, tamper resistance thereof can be enhanced. Since the reliability and the tamper resistance of the list are high, the first apparatus can update the list in the second distributed ledger based on the first transaction data received from the management apparatus that proposes update of the list in the second distributed ledger and can disclose information on the chemical substance included in the updated list in the second distributed ledger to the second apparatus that belongs to the downstream company. Therefore, the first apparatus can save manual works such as verification of reasonability of update of the list in the second distributed ledger. Consequently, the first apparatus can be configured to automatically disclose information on the chemical substance contained in the product supplied to the downstream company and included in the list in the second distributed ledger. Therefore, addressing revision of the laws and regulations that regulate the chemical substance can be facilitated.

(2) In one embodiment, the management apparatus obtains information on the laws and regulations from an external apparatus that manages information on the laws and regulations.

According to the configuration, the management apparatus can obtain information on the laws and regulations from the external apparatus that manages information on the laws and regulations and can update the list in the first distributed ledger based on the obtained information.

(3) In one embodiment, the second apparatus includes a third distributed ledger. The second distributed ledger includes a secret area and a public area. The secret area is an area where transaction data not shared with the first distributed ledger and the third distributed ledger is stored. The public area is an area where transaction data shared with at least one of the first distributed ledger and the third distributed ledger is stored. In the first apparatus, composition data of the product supplied to the downstream company is stored in the secret area, and the first apparatus extracts from the composition data, the information on the designated chemical substance included in the list in the second distributed ledger and transmits the second transaction data including the extracted information on the designated chemical substance to the second apparatus.

According to the configuration, since composition data of the product supplied to the downstream company is stored in the secret area in the second distributed ledger, it is concealed from the management apparatus and the second apparatus. Storage of the composition data in the secret area in the second distributed ledger allows on-chain extraction from the composition data, of information on the chemical substance included in the list in the second distributed ledger. Therefore, automated design of information disclosure can be facilitated.

(4) In one embodiment, the first apparatus is configured to communicate with a plurality of terminal apparatuses, incorporates a web application accessible through a web browser, and discloses, when the list in the second distributed ledger is updated, the information on the designated chemical substance added to the list in the second distributed ledger, by using the web application. Each of the plurality of terminal apparatuses has approval authority for disclosure of information on at least any one chemical substance of chemical substances contained in the product supplied to the downstream company, and approves disclosure of the information on the at least any one chemical substance to the downstream company through the web browser.

In order to disclose information on the chemical substance to the outside, approval for information disclosure should be obtained from a person who has authority in a company. According to the configuration, a system that obtains approval for information disclosure can readily be constructed with the use of a web application.

(5) In one embodiment, the first apparatus transmits the second transaction data to the second apparatus after the first apparatus obtains approval from a terminal apparatus having the approval authority in connection with the designated chemical substance among the plurality of terminal apparatuses.

According to the configuration, disclosure of information on the chemical substance while approval for information disclosure has not been obtained can be prevented.

(6) In one embodiment, the first apparatus is configured to communicate with a plurality of terminal apparatuses. Each of the plurality of terminal apparatuses has approval authority for disclosure of information on at least one chemical substance of chemical substances contained in the product supplied to the downstream company. The first apparatus includes a map showing correspondence between a chemical substance contained in the product supplied to the downstream company and approval authority that each of the plurality of terminal apparatuses has, specifies based on the map, when the list in the second distributed ledger is updated, a terminal apparatus having the approval authority for disclosure of the information on the designated chemical substance added to the list in the second distributed ledger, and transmits to the specified terminal apparatus, third transaction data that indicates a request for approval for disclosure of information on the designated chemical substance added to the list in the second distributed ledger.

In order to disclose information on the chemical substance to the outside, approval for information disclosure should be obtained from a person who has authority in a company. According to the configuration, by applying the distributed ledger technology also to each of the plurality of terminal apparatuses, a system that obtains approval for information disclosure can readily be constructed.

(7) In one embodiment, the specified terminal apparatus transmits to the first apparatus, fourth transaction data responding to the request.

According to the configuration, the first apparatus can obtain approval for disclosure of information on the chemical substance from the specified terminal apparatus.

(8) An information management method according to another aspect of the present disclosure is an information management method in an information management system that manages information on a chemical substance contained in a product distributed in a supply chain based on a distributed ledger technology. The information management system includes a management apparatus that manages the information management system, the management apparatus including a first distributed ledger including a list that shows a chemical substance managed in the information management system, and a first apparatus that belongs to a company included in the supply chain, the first apparatus including a second distributed ledger including the list. The chemical substance included in the list refers to a chemical substance designated under laws and regulations. The information management method includes, when a new chemical substance is designated under the laws and regulations, adding, by the management apparatus, the designated chemical substance to the list in the first distributed ledger to update the list in the first distributed ledger, transmitting, by the management apparatus, to the first apparatus, first transaction data that proposes addition of the designated chemical substance and update of the list in the second distributed ledger, updating, by the first apparatus, the list in the second distributed ledger based on the first transaction data, and transmitting, by the first apparatus, to a second apparatus that belongs to a downstream company in the supply chain, second transaction data including information on the designated chemical substance contained in a product supplied to the downstream company and included in the list in the second distributed ledger.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
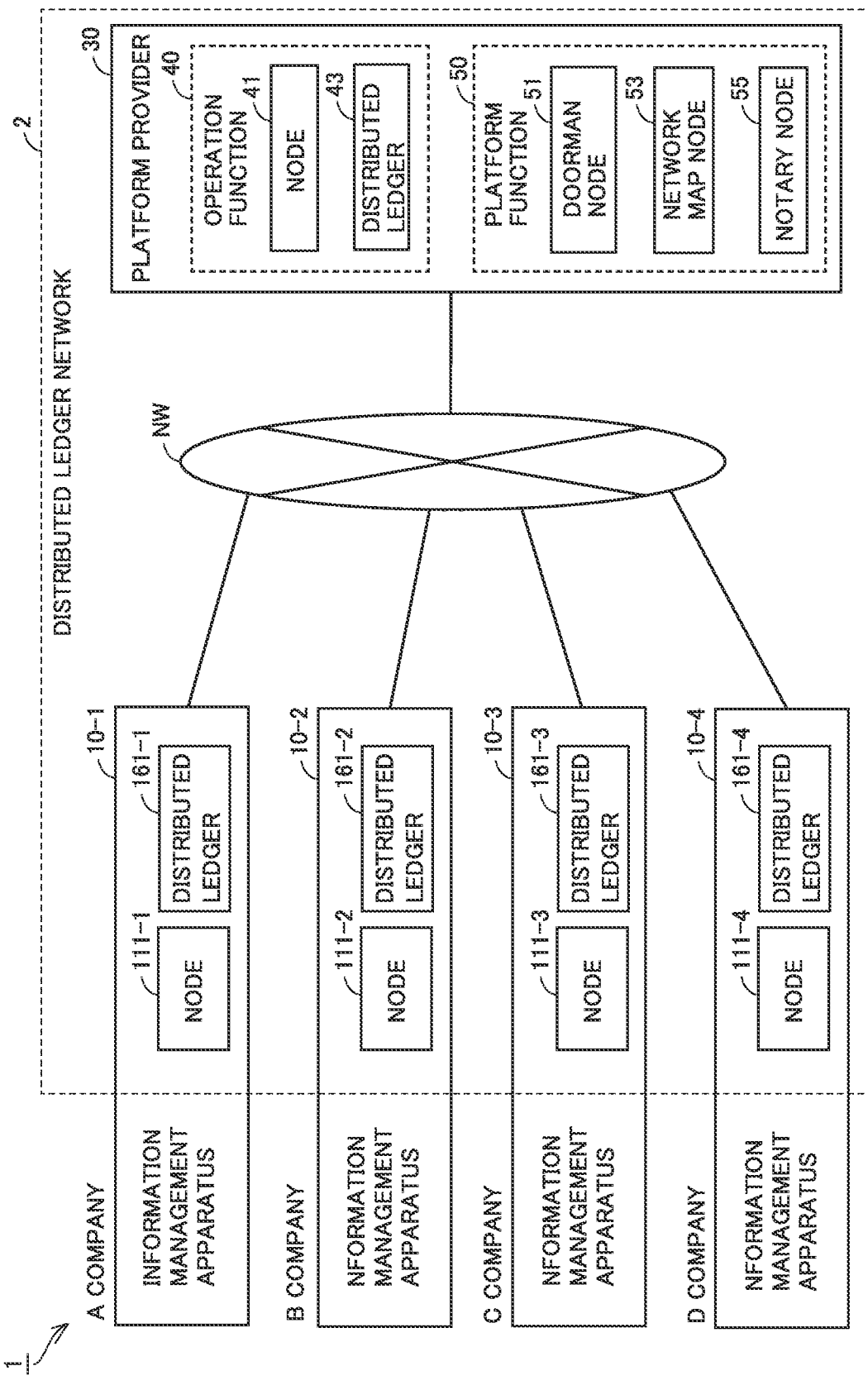
FIG. 1 is a diagram showing a schematic configuration of an information management system according to an embodiment.

An embodiment of the present disclosure will be described in detail below with reference to the drawings. The same or corresponding elements in the drawings have the same reference characters allotted and description thereof will not be repeated.

<Overall Configuration of Information Management System>

FIG. 1 is a diagram showing a schematic configuration of an information management system 1 according to the present embodiment. Information management system 1 according to the present embodiment manages, based on a distributed ledger technology, information on a subject substance in a supply chain including a plurality of companies. The subject substance refers to a specific chemical substance contained in a product (including a component and a raw material) distributed in the supply chain. The supply chain in the present embodiment includes four companies (A company, B company, C company, and D company) by way of example. In information management system 1, the subject substance is a substance required to be reported to a downstream company in the supply chain. The subject substance includes a chemical substance designated as a substance of very high concern (SVHC) as a highly harmful substance under the REACH regulation and/or a chemical substance designated in a global automotive declarable substance list (GADSL) which is a chemical substance list managed worldwide. The chemical substance designated as the SVHC and/or the chemical substance designated in the GADSL are/is also referred to as a "restricted substance(s)" below. The restricted substance may include a chemical substance designated under other laws and regulations. Furthermore, a company that participates in information management system 1 may also have an optional chemical substance included as the subject substance. In other words, the subject substance managed by information management system 1 may include the restricted substance and the chemical substance optionally designated by a participating company. Each company is obliged to convey (report) information on the restricted substance to a downstream company. On the other hand, each company is not obliged to transmit to a downstream company, information on the chemical substance optionally designated by the participating company. Information management system 1 manages the restricted substance based on a restriction list (which will be described later). In other words, even when a downstream company issues a disclosure request to request an upstream company to disclose the subject substance, the upstream company can reject the disclosure request so long as the subject substance falls under a chemical substance different from the restricted substance (that is, a chemical substance not registered in the restriction list).

Information management system 1 includes an information management apparatus 10-1, an information management apparatus 10-2, an information management apparatus 10-3, an information management apparatus 10-4, and a platform provider 30. Information management apparatuses 10-1, 10-2, 10-3, and 10-4 belong to A company, B company, C company, and D company, respectively. A company is an end product manufacturer and falls under what is called a "downstream company" in the supply chain. B company is a component manufacturer and falls under what is called a "midstream company" in the supply chain. C company and D company are material manufacturers and fall under what is called "upstream companies" in the supply chain.

Figure 2:
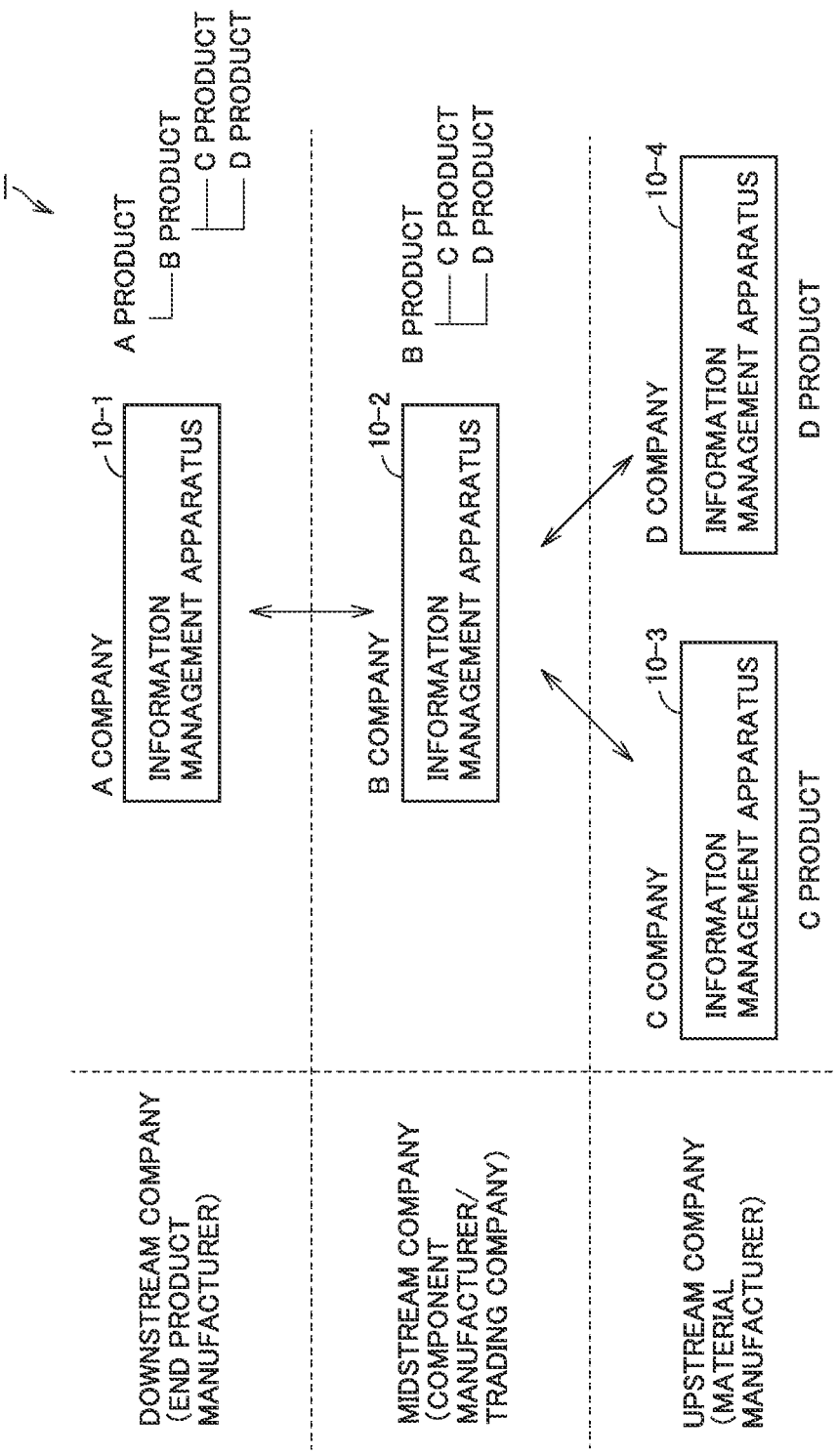
FIG. 2 is a diagram for illustrating business relation among companies in a supply chain.

FIG. 2 is a diagram for illustrating business relation among companies in the supply chain. C company supplies a C product which is its product to B company. D company supplies a D product which is its product to B company. B company manufactures a B product which is its product from the C product purchased (supplied) from C company and the D product purchased from D company, and supplies the B product to A company. A company manufactures an A product which is its product from the product purchased from B company and sells the A product to an end user. A company is, for example, an automaker.

The midstream company may include a trading company. A trading company may be interposed, for example, between A company and B company, between B company and C company, and/or between B company and D company.

Each company is required to manage information on a subject substance contained in a product sold by that company itself (its own product). Each company in the supply chain obtains information on the subject substance contained in a product it purchased from an upstream company and manages information on the subject substance contained in its own product. For example, A company receives from B company, information on the subject substance contained in the B product, and based on that information, A company manages the information on the subject substance contained in the A product.

In information management system 1 according to the present embodiment, information is conveyed only between companies in direct business relation with each other. For example, since a downstream company (A company) and a midstream company (B company) are in supply-demand relation of products with each other, they are in direct business relation with each other. Since a midstream company (B company) and an upstream company (C company and D company) are in supply-demand relation of products with each other, they are in direct business relation with each other. On the other hand, a downstream company (A company) and an upstream company (C company and D company) are not in direct business relation. In other words, information is conveyed between the downstream company (A company) and the midstream company (B company) and between the midstream company (B company) and the upstream company (C company and D company), whereas information is not conveyed between the downstream company (A company) and the upstream company (C company and D company). For example, when E company which is a trading company is interposed between A company and B company, information is conveyed between A company and E company and between E company and B company, whereas information is not conveyed between A company and B company.

For example, when trade of the C product is started between B company and C company, information at least on restricted substances of subject substances contained in the C product is provided from C company to B company. Specifically, C company voluntarily provides information on restricted substances among subject substances contained in the C product to B company, or C company provides that information to B company in response to a request from B company. On the other hand, C company voluntarily provides information on a chemical substance different from the restricted substance among the subject substances contained in the C product to B company, or C company provides that information to B company in response to a request from B company. In other words, C company may not provide to B company, information on the chemical substance different from the restricted substance among the subject substances contained in the C product. This is also applicable to information provided between A company and B company and between B company and D company. When trade of the D product is started between B company and D company, D company provides information at least on a restricted substance among subject substances contained in the D product to B company. When trade of the B product is started between A company and B company, B company provides information at least on the restricted substance among the subject substances contained in the B product to A company. Each company thus receives information at least on the restricted substance among the subject substances contained in a product it purchased from an upstream company in direct business relation. Then, each company manages information on the subject substance contained in its own product including the purchased product. Information is conveyed between companies over a distributed ledger network 2 (FIG. 1) including information management apparatuses 10-1 to 10-4 and platform provider 30.

Referring again to FIG. 1, distributed ledger platform software has been introduced in each of information management apparatuses 10-1 to 10-4. The distributed ledger platform includes smart contract that allows limitation of a range where transaction data is shared to a range between concerned parties. Therefore, distributed ledgers 161-1 to 161-4 of information management apparatuses 10-1 to 10-4 hold transaction data that are different from one another. For example, CORDA® may be adopted as the distributed ledger platform. Distributed ledgers 161-1 to 161-4 are also collectively denoted as a "distributed ledger 161-N."

As the introduced distributed ledger platform software functions, controllers 110-1 to 110-4 (FIG. 6 which will be described later) included in information management apparatuses 10-1 to 10-4 function as nodes 111-1 to 111-4, respectively. Communication among nodes 111-1 to 111-4 over a network NW allows formation of distributed ledger network 2. Information management apparatuses 10-1 to 10-4 are basically similar in configuration to one another. Therefore, when information management apparatuses 10-1 to 10-4 are not particularly distinguished from one another, they are also denoted as an "information management apparatus 10-N." Nodes 111-1 to 111-4 may also be denoted as a "node 111-N" so long as they are not particularly distinguished from one another.

Figure 3:
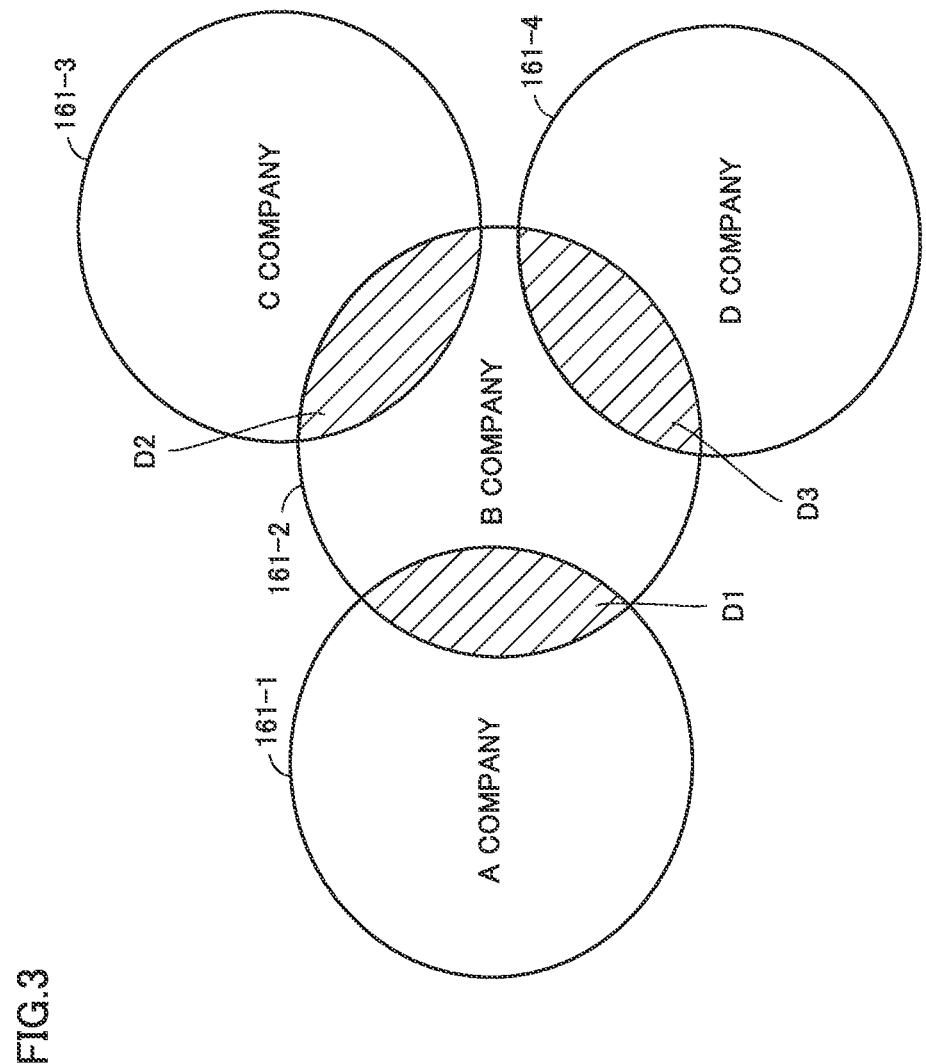
FIG. 3 is a conceptual diagram for illustrating a distributed ledger.

FIG. 3 is a conceptual diagram for illustrating distributed ledger 161-N. FIG. 3 schematically shows relation among distributed ledgers 161-1 to 161-4 stored in respective information management apparatuses 10-1 to 10-4.

Distributed ledger 161-1 and distributed ledger 161-2 share transaction data transmitted and received between information management apparatus 10-1 (node 111-1) of A company and information management apparatus 10-2 (node 111-2) of B company (a region D1). Region D1 includes, for example, transaction data including information on the subject substance contained in the B product, that is transmitted and received between nodes 111-1 and 111-2. Region D1 also includes transaction data for an inquiry about the subject substance contained in the B product and transaction data on an answer to the inquiry that are transmitted and received between nodes 111-1 and 111-2.

Distributed ledger 161-2 and distributed ledger 161-3 share transaction data transmitted and received between information management apparatus 10-2 (node 111-2) of B company and information management apparatus 10-3 (node 111-3) of C company (a region D2). Region D2 includes transaction data including information on the subject substance contained in the C product, that is transmitted and received between nodes 111-2 and 111-3. Region D2 also includes transaction data for an inquiry about the subject substance contained in the C product and transaction data on an answer to the inquiry that are transmitted and received between nodes 111-2 and 111-3.

Distributed ledger 161-2 and distributed ledger 161-4 share transaction data transmitted and received between information management apparatus 10-2 (node 111-2) of B company and information management apparatus 10-4 (node 111-4) of D company (a region D3). Region D3 includes transaction data including information on the subject substance contained in the D product, that is transmitted and received between nodes 111-2 and 111-4. Region D3 also includes transaction data for an inquiry about the subject substance contained in the D product and transaction data on an answer to the inquiry that are transmitted and received between nodes 111-2 and 111-4.

For example, B company, which is the midstream company in the supply chain, may not want A company to know information about from which company it purchases the C product and the D product included in the B product. Transaction data includes information on a sender node and a destination node. Therefore, if transaction data is broadcast to all nodes that form distributed ledger network 2, A company may recognize a source of the C product and the D product. In information management system 1 according to the present embodiment, the range within which transaction data is shared is limited to the range between concerned parties. Consequently, disclosure of information (a company name or the like) on a business partner to a company other than a company in direct business relation can be prevented.

Referring again to FIG. 1, distributed ledger network 2 in information management system 1 is a consortium/private network. Platform provider 30 functions as a manager of information management system 1. Platform provider 30 performs, as its function, an operation function 40 and a platform function 50. Operation function 40 includes a node 41, a list manager 42 (FIG. 5), and a distributed ledger 43, and performs a node function to register and update a restriction list (which will be described later) in distributed ledger network 2. Details of operation function will be described later. Platform provider 30 corresponds to an exemplary "management apparatus" according to the present disclosure.

Platform function 50 includes a doorman node 51, a network map node 53, and a notary node 55 and functions as a platformer that manages distributed ledger network 2.

Doorman node 51 approves an application for participation from node 111-N and node 41 that desire participation into distributed ledger network 2. Doorman node 51 issues a certificate to node 111-N and node 41. Node 111-N and node 41 that participate in distributed ledger network 2 each create a pair of a secret key and a public key at the time of participation (for example, at the time of initial start-up) and transmits a request for grant of the certificate to doorman node 51. Doorman node 51 verifies a predetermined condition and issues the certificate to node 111-N and node 41 that issued the request for grant of the certificate.

Information (for example, an IP address) of node 111-N and node 41, to which the certificate was issued by doorman node 51 (that is, participation of which into distributed ledger network 2 was permitted), is stored in network map node 53. Network map node 53 functions as a domain name system (DNS) in distributed ledger network 2. Nodes 111-1 to 111-4 and node 41 that form distributed ledger network 2 recognize a destination of transaction data, for example, based on information provided from network map node 53.

Notary node 55 gives finality to transaction data. When node 111-N and node 41 generate transaction data, they send transaction data including a hash value (a transaction ID) of the transaction data and an index of output of the transaction data to notary node 55. This transaction data includes a signature of a transaction data sender node (for example, node 111-2 of B company) and a signature of a transaction data destination node (for example, node 111-1 of A company). Notary node 55 verifies the transaction data based on the transaction ID and the index of output, and thereafter puts the signature to the transaction data and sends back the transaction data. Notary node 55 guarantees the order of the transaction data by sequentially holding the signed transaction data. For example, notary node 55 may hold a map. This map includes the transaction ID and the index of output as keys and includes the transaction ID, an index of input, and peer (node) information as values. When there is no matching key in the map, notary node 55 adds the transaction data to the map and puts the signature to the transaction data. When there is a matching key in the map, notary node 55 sends back an error.

Node 111-N and node 41 generate transaction data. As the distributed ledger platform software functions as described above, controller 110-N (FIG. 6) included in information management apparatus 10-N functions as node 111-N. As distributed ledger platform software functions, a controller 31 (FIG. 5) included in platform provider 30 functions as node 41.

In information management system 1, platform provider 30 (operation function 40) monitors revision of the laws and regulations etc. (that is, update of the restricted substance (s)). Specifically, platform provider 30 monitors, for example, update of the SVHC and/or update of the GADSL. When platform provider 30 senses such update, that is, when a new chemical substance is designated as an SVHC and/or when a new chemical substance is designated in the GADSL, platform provider 30 senses addition of the restricted substance. When node 41 of platform provider 30 senses addition of the restricted substance, it transmits transaction data that proposes addition of the restricted substance (update of the restriction list) to all nodes 111-1 to 111-4.

When the restriction list is updated, information management apparatus 10-N discloses to the downstream company, product composition data including information on the restricted substance added as a result of update. The product composition data is important information for each company. In order to disclose to the outside, information on the restricted substance newly added to the restriction list, an approval should be obtained in a company. Information management apparatus 10-N performs a workflow function to automate a process for obtaining approval for disclosure of information on the restricted substance. The workflow function can also be applied to disclosure of information on a chemical substance different from the restricted substance.

Figure 4:
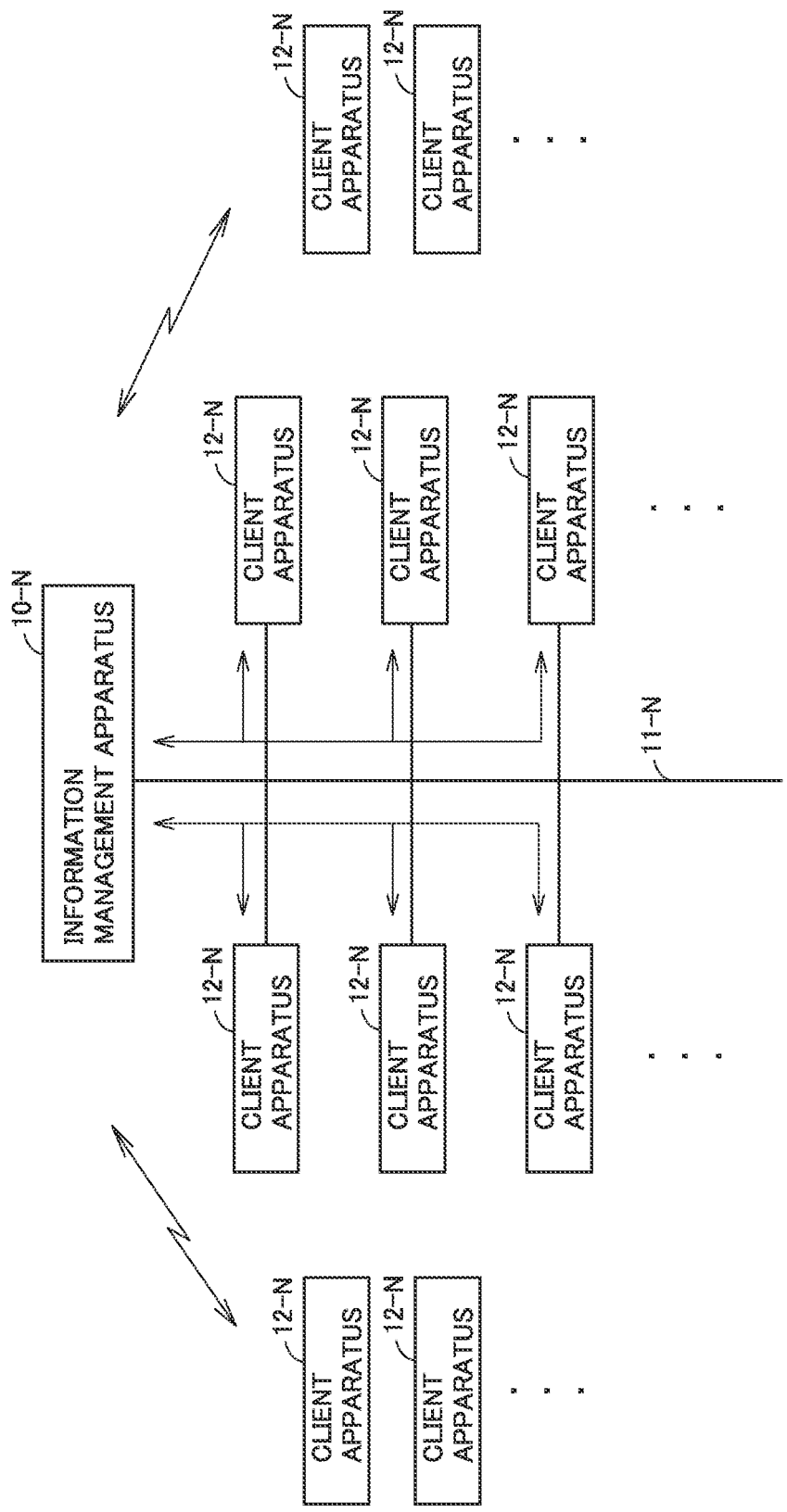
FIG. 4 is a diagram for illustrating a workflow function.

FIG. 4 is a diagram for illustrating the workflow function. Referring to FIG. 4, a plurality of client apparatuses 12-N are connected to information management apparatus 10-N to establish wireless or wired communication. Information management apparatus 10-N and client apparatus 12-N capable of establishing wired communication are each connected to a bus 11-N.

Each of the plurality of client apparatuses 12-N is a terminal apparatus belonging to a company the same as the company that manages information management apparatus 10-N or a company associated therewith. The plurality of client apparatuses 12-N belong, for example, to departments different from one another. Specifically, in an example of information management apparatus 10-2 of B company, the plurality of client apparatuses 12-N belong, for example, to departments different from one another in B company.

When a new restricted substance is designated as a result of revision of laws and regulations etc., approval for disclosure of information on the new restricted substance to the outside (the downstream company) should be obtained in the company. A department having approval authority for disclosure of information on the chemical substance may be different for each chemical substance.

Information management apparatus 10-N incorporates a web application (which is also simply referred to as a "web app" below). Each of the plurality of client apparatuses 12-N uses the web app through a web browser. The workflow function in the present embodiment is performed with the use of the web app. When information management apparatus 10-N starts the workflow function, it notifies a client apparatus group (the plurality of client apparatuses 12-N) of start of the workflow.

Client apparatus 12-N of the department having the approval authority (approval department) is set in advance for each chemical substance contained in a composition of a product. Each of the plurality of client apparatuses 12-N refers to the web app every prescribed cycle after it receives a notification about start of the workflow until it receives a notification about end of the workflow. Information management apparatus 10-N discloses information on the newly designated restricted substance to the plurality of client apparatuses 12-N with the use of the web app. Each of the plurality of client apparatuses 12-N determines whether or not a department to which it belongs is the approval department that approves disclosure of information on the newly designated restricted substance. Client apparatus 12-N belonging to the approval department performs prescribed approval processing when the restricted substance, disclosure of information on which may be approved by the client apparatus itself, is newly designated. Thereafter, such client apparatus 12-N approves disclosure to the downstream company, of information on the restricted substance contained in the product of the company to which it belongs (company's product). The prescribed approval processing may include processing for checking whether or not a content of the restricted substance in the company's product is equal to or more than a report threshold value. The report threshold value refers to a threshold value of a ratio (a content ratio) of the subject substance contained per unit amount of the product. The prescribed value is determined, for example, under the laws and regulations. The upstream company is obliged to disclose information on the restricted substance in its product to the downstream company when the content of the restricted substance is equal to or more than the prescribed value. The report threshold value may be the prescribed value. The prescribed approval processing is performed, for example, automatically by a program incorporated in client apparatus 12-N or manually by a manager (employee) of a management department of client apparatus 12-N.

When information management apparatus 10-N senses approval by client apparatus 12-N in the approval department, it notifies the client apparatus group (the plurality of client apparatuses 12-N) of end of the workflow. The workflow function thus ends.

Node 111-N of information management apparatus 10-N generates transaction data that reports product composition data including information on the restricted substance, disclosure of information on which has been approved, and transmits the transaction data to the node of the downstream company. Information on the restricted substance is thus reported to the downstream company. When a restricted substance is newly designated, only information on the restricted substance may be reported from the upstream company to the downstream company, or product composition data to which information on the restricted substance has been added may be reported from the upstream company to the downstream company.

<Hardware Configuration>

Figure 5:
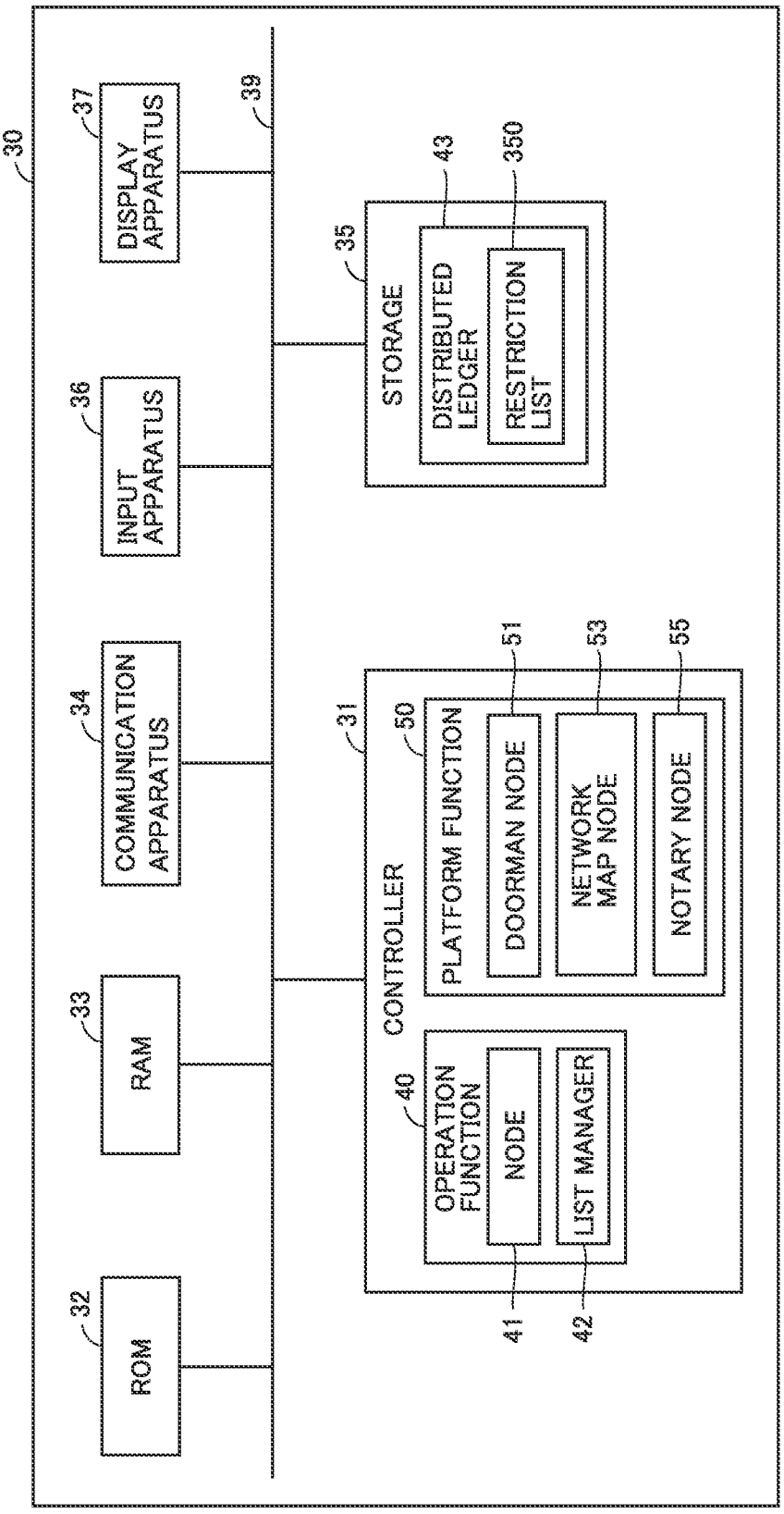
FIG. 5 is a diagram schematically showing a hardware configuration of a platform provider.

FIG. 5 is a diagram schematically showing a hardware configuration of platform provider 30. Platform provider 30 includes controller 31, a read only memory (ROM) 32, a random access memory (RAM) 33, a communication apparatus 34, a storage 35, an input apparatus 36, and a display apparatus 37. Controller 31, ROM 32, RAM 33, communication apparatus 34, storage 35, input apparatus 36, and display apparatus 37 are each connected to a bus 39.

Controller 31 includes an integrated circuit including a central processing unit (CPU). Controller 31 develops various programs stored in ROM 32 on RAM 33 and executes the programs. The various programs include, for example, distributed ledger platform software. RAM 33 functions as a working memory, and various types of data necessary for execution of the various programs are temporarily stored in RAM 33. Controller 31 performs various types of processing by executing a program stored in ROM 32.

Communication apparatus 34 is configured to communicate with external equipment. The external equipment includes, for example, information management apparatus 10-N included in distributed ledger network 2. Communication apparatus 34 and the external equipment communicate with each other, for example, over the Internet. Examples of the external equipment include a server apparatus in an external group that publishes a restricted substance on the Internet.

Input apparatus 36 is, for example, a mouse, a keyboard, a touch panel, and/or another apparatus that can receive an operation by a user.

Display apparatus 37 shows various images in accordance with a control signal from controller 31. Display apparatus 37 is, for example, a liquid crystal display, an organic electroluminescence (EL) display, or another display device.

Storage 35 includes a storage medium such as a hard disk or a flash memory. Distributed ledger 43 is stored in storage 35. Distributed ledger 43 and distributed ledger 161-N of information management apparatus 10-N are each, for example, in a directed acyclic graph (DAG) structure. Transaction data included in distributed ledger 43 and distributed ledger 161-N forms a partially ordered data model. In the present embodiment, one piece of transaction data forms one block.

Distributed ledger 43 includes a restriction list 350. Restriction list 350 is information indicating a restricted substance. The restricted substance refers, for example, to a chemical substance designated as the SVHC and/or a chemical substance designated in the GADSL. Restriction list 350 includes information on at least one restricted substance. Information on the restricted substance includes a CAS number, a name of a substance, a date of update of restriction, and a report threshold value. The CAS number is an identification number specific to a chemical substance provided in a chemical substance registration system in the Chemical Abstracts Service (CAS) of the American Chemical Society. The name of the substance refers to a name of a subject substance. The date of update of restriction refers to a date on which the subject substance is added to restriction list 350 (date on which the subject substance is subjected to reporting to a downstream company) or the date when restriction is imposed on the subject substance under the laws and regulations (for example, the date of designation as the SVHC). The report threshold value is a threshold value of a ratio (content ratio) of a subject substance contained per unit amount of a product. When a content is equal to or more than the report threshold value, information on the subject substance in that product should be given to a downstream company. When the content is lower than the report threshold value, information on the subject substance does not have to be given.

A secret key generated by node 41 of controller 31 may be stored in storage 35.

Controller 31 functions as node 41 and list manager 42 by executing a program relating to operation function 40.

At the time of initial start-up, node 41 generates a secret key and a public key in conformity with a prescribed standard. The public key is sent, for example, to network map node 53 of platform function 50. Node 41 performs a function to generate transaction data. Node 41 generates an electronic signature based on the secret key and puts the electronic signature to the transaction data. The secret key is stored, for example, in storage 35 or another storage (not shown). Node 41 performs a function to approve transaction data proposed by another node. Node 41 verifies the transaction data proposed by another node, and when it sees no problem in a result of verification, it puts the electronic signature to the transaction data and sends the transaction data back to another node.

List manager 42 manages restriction list 350. List manager 42 communicates with the outside in prescribed cycles through communication apparatus 34 and monitors revision of the laws and regulations (addition of the restricted substance). Specifically, list manager 42 communicates with a server apparatus of an external group in prescribed cycles through communication apparatus 34 to monitor whether or not a new restricted substance has been designated as the SVHC or whether or not a new chemical substance has been designated in the GADSL. When list manager 42 senses addition of the new chemical substance (addition of the restricted substance) to the SVHC as a result of revision of the laws and regulations, it requests node 41 to add the restricted substance to restriction list 350.

When node 41 receives a request for update of restriction list 350 from list manager 42, it generates transaction data to add the newly designated restricted substance to restriction list 350 and puts a signature to the transaction data. The newly designated restricted substance is thus added to restriction list 350 and restriction list 350 is updated. Then, node 41 transmits the signed transaction data to all nodes 111-1 to 111-4 that participate in distributed ledger network 2. In other words, node 41 transmits to all nodes 111-1 to 111-4 that participate in distributed ledger network 2, transaction data that proposes inclusion of the newly designated restricted substance in a restriction list 165-N (FIG. 6) of information management apparatus 10-N. Node 111-N that receives this transaction data approves the transaction data. The transaction data is thus added to distributed ledger 161-N of node 111-N so that restriction list 165-N of information management apparatus 10-N is updated.

Controller 31 functions as doorman node 51, network map node 53, and notary node 55 by executing a program relating to platform function 50. Since these functions are as described above, detailed description thereof will not be repeated.

Figure 6:
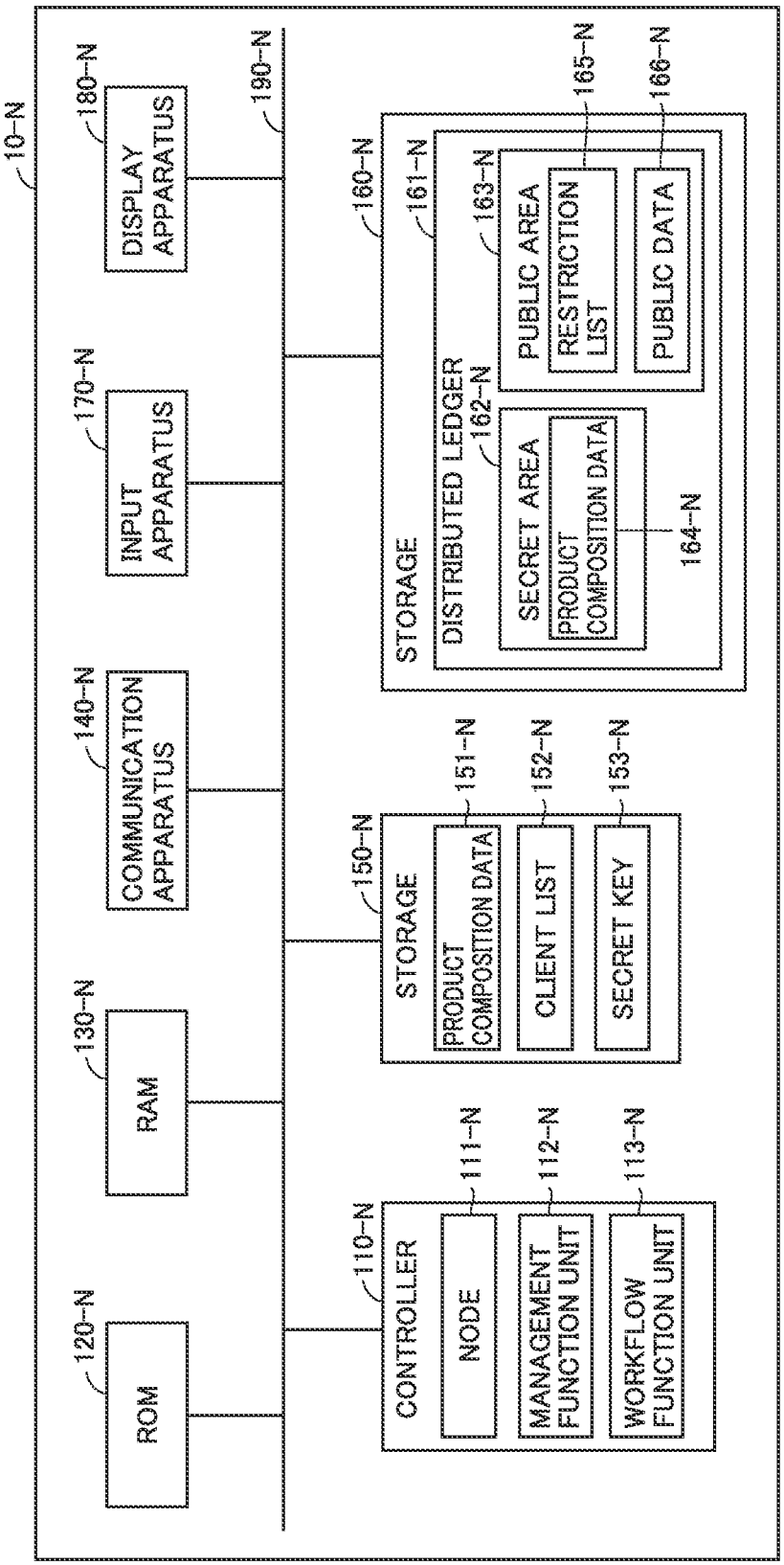
FIG. 6 is a diagram schematically showing a hardware configuration of an information management apparatus.

FIG. 6 is a diagram schematically showing a hardware configuration of information management apparatus 10-N. Information management apparatus 10-N includes a controller 110-N, a ROM 120-N, a RAM 130-N, a communication apparatus 140-N, a storage 150-N, a storage 160-N, an input apparatus 170-N, and a display apparatus 180-N. Controller 110-N, ROM 120-N, RAM 130-N, communication apparatus 140-N, storage 150-N, storage 160-N, input apparatus 170-N, and display apparatus 180-N are each connected to a bus 190-N.

Controller 110-N includes an integrated circuit including a CPU. Controller 110-N develops various programs stored in ROM 120-N on RAM 130-N and executes the programs. The various programs include, for example, distributed ledger platform software. RAM 130-N functions as a working memory, and various types of data necessary for execution of the various programs are temporarily stored in RAM 130-N. Controller 110-N performs various types of processing by executing a program stored in ROM 120-N.

Communication apparatus 140-N is configured to communicate with external equipment. The external equipment includes, for example, another information management apparatus included in distributed ledger network 2 and platform provider 30. Communication apparatus 140-N and the external equipment communicate with each other, for example, over the Internet.

Input apparatus 170-N is, for example, a mouse, a keyboard, a touch panel, and/or another apparatus that can accept an operation by a user.

Display apparatus 180-N shows various images in accordance with a control signal from controller 110-N. Display apparatus 180-N is, for example, a liquid crystal display, an organic EL display, or another display device.

Storage 150-N includes a storage medium such as a hard disk or a flash memory. Information stored in storage 150-N is managed off-chain (on the outside of distributed ledger network 2). Product composition data 151-N of a company's product to which it belongs (the company's product), a client list 152-N, and a secret key 153-N are stored in storage 150-N. In an example of information management apparatus 10-1 of A company, product composition data 151-1 includes composition data of the A product. In an example of information management apparatus 10-2 of B company, product composition data 151-2 includes composition data of the B product. In an example of information management apparatus 10-3 of C company, product composition data 151-3 includes composition data of the C product. In an example of information management apparatus 10-4 of D company, product composition data 151-4 includes composition data of the D product.

Client list 152-N includes information on a company to which disclosure of information is permitted. Specifically, downstream companies that do direct business transactions in the supply chain are registered in client list 152-N. In the example of information management apparatus 10-1 of A company, no company has been registered in client list 152-1. In the example of information management apparatus 10-2 of B company, A company has been registered in client list 152-2. In the example of information management apparatus 10-3 of C company, B company has been registered in client list 152-3. In the example of information management apparatus 10-4 of D company, B company has been registered in client list 152-4. No answer is given to an inquiry from a company not registered in client list 152-N. Client list 152-1 does not have to be stored in storage 150-1 of information management apparatus 10-1.

A secret key 153-N and a public key (not shown) generated by controller 110-N are stored in storage 150-N. A certificate (not shown) issued by doorman node 51 of platform provider 30 is stored in storage 150-N.

Storage 160-N includes a storage medium such as a hard disk or a flash memory. Information stored in storage 160-N is managed on-chain (in the inside of distributed ledger network 2). Distributed ledger 161-N is stored in storage 160-N.

Distributed ledger 161-N includes a secret area 162-N and a public area 163-N. Secret area 162-N is an area where transaction data shared with none of other nodes is stored. In other words, secret area 162-N is an area where transaction data held only by distributed ledger 161-N on-chain is stored. Public area 163-N is an area where transaction data shared with at least one other node on-chain is stored.

Product composition data 164-N is stored in secret area 162-N. Product composition data 164-N is the same as product composition data 151-N stored in storage 150-N in its content. When product composition data 151-N is stored in storage 150-N, controller 110-N has product composition data 164-N identical in content to product composition data 151-N stored also in on-chain secret area 162-N (secret area 162-N in distributed ledger 161-N). Information on a chemical substance (restricted substance) newly added to restriction list 165-N can thus automatically be extracted from product composition data 164-N as a result of processing (on-chain processing) by node 111-N (specifically, node 111-N and a management function unit 112-N). For example, node 111-N is unable to extract information on the newly designated restricted substance from product composition data 151-N stored off-chain. In order to extract the information on the newly designated restricted substance from product composition data 151-N stored off-chain, for example, a feature for extraction of this information should separately be added or intervention by manual processing is required. As product composition data 164-N is stored on-chain, node 111-N is able to extract the information on the newly designated restricted substance from product composition data 164-N. A series of processing including update of restriction list 350 by platform provider 30, update of restriction list 165-N in response to restriction list 350, and extraction of information on the newly designated substance from product composition data 164-N based on restriction list 165-N can thus be automated.

Restriction list 165-N and public data 166-N are stored in public area 163-N. Restriction list 165-N is updated in association with update of restriction list 350 by platform provider 30. When node 41 of platform provider 30 adds a restricted substance newly designated as a result of revision of the laws and regulations to restriction list 350 to update restriction list 350, it transmits to node 111-N of information management apparatus 10-N, transaction data that proposes addition of the newly designated restricted substance to restriction list 165-N and update of restriction list 165-N. As node 111-N approves the transaction data, the transaction data is added to distributed ledger 161-N and restriction list 165-N is updated.

Public data 166-N is created when information on the restricted substance included in restriction list 165-N is extracted from product composition data 164-N. In other words, public data 166-N is information on the chemical substance included in product composition data 164-N and included in restriction list 165. For example, transaction data including public data 166-N is transmitted to the node of the downstream company.

Controller 110-N functions as node 111-N, management function unit 112-N, and a workflow function unit 113-N by executing a program stored in ROM 120-N.

At the time of initial start-up, node 111-N generates secret key 153-N and a public key in conformity with a prescribed standard. Secret key 153-N is stored in storage 150-N. The public key is sent, for example, to network map node 53 of platform provider 30. Node 111-N performs a function to generate transaction data. Node 111-N generates an electronic signature with the use of secret key 153-N and puts the electronic signature to the transaction data. Node 111-N performs a function to approve transaction data proposed by another node. Node 111-N verifies the transaction data proposed by another node, and when it sees no problem in a result of verification, it puts the electronic signature to the transaction data and sends the transaction data back to another node.

When node 111-N receives from node 41 of platform provider 30, the transaction data that proposes inclusion of the restricted substance newly designated as a result of revision of the laws and regulations into restriction list 165-N, it verifies the transaction data and thereafter approves the transaction data. Then, node 111-N has the transaction data stored in distributed ledger 161-N. The newly designated restricted substance is thus added to restriction list 165-N and restriction list 165-N is updated.

Management function unit 112-N performs influence checking processing and client information obtaining processing. Management function unit 112-N senses update of restriction list 165-N by node 111-N. Management function unit 112-N performs processing (influence checking processing) for checking whether or not information on the restricted substance added to restriction list 165-N as a result of update should be disclosed to the downstream company. Specifically, management function unit 112-N determines a content ratio in the product of the company to which it belongs, of the restricted substance added to restriction list 165-N in accordance with product composition data 164-N, and checks whether or not the content ratio is equal to or more than the report threshold value. When the content ratio of the restricted substance is equal to or more than the report threshold value, management function unit 112-N determines that information on the restricted substance should be disclosed to the downstream company. In other words, management function unit 112-N confirms that update of restriction list 165-N affects itself. When the content ratio of the restricted substance is lower than the report threshold value, management function unit 112-N determines that the information on the restricted substance does not have to be disclosed to the downstream company. In other words, management function unit 112-N confirms that update of restriction list 165-N does not affect itself.

When update of restriction list 165-N affects management function unit 112-N, it performs processing (client information obtaining processing) for reading information (client information) on the downstream company from storage 150-N. Specifically, management function unit 112-N reads the client information by referring to client list 152-N stored in storage 150-N. Management function unit 112-N gives to workflow function unit 113-N, information on the restricted substance to be reported to the downstream company. The function to perform influence checking processing by management function unit 112-N may be performed by node 111-N. The function to perform client information obtaining processing by management function unit 112-N may also be performed by node 111-N. In this case, for example, information similar to client list 152-N is stored also in secret area 162-N. In other words, information similar to client list 152-N is also stored on-chain. Node 111-N can thus read client information from distributed ledger 161-N.

Workflow function unit 113-N notifies a client apparatus group (FIG. 4) of start and end of a workflow. When workflow function unit 113-N obtains with its workflow function, approval for disclosure of information on the restricted substance added to restriction list 165-N from client apparatus 12-N in the approval department, it gives notification about obtainment of the approval to management function unit 112-N.

When management function unit 112-N receives an approval notification from workflow function unit 113-N, it requests node 111-N to update public data 166-N.

When node 111-N receives the request for update of public data 166-N, it adds information on the restricted substance, for which approval for information disclosure has been obtained, to update public data 166-N. Then, node 111-N generates transaction data including public data 166-N and transmits the transaction data to the node of the downstream company of interest. When the node of the downstream company approves the transaction data, public data 166-N is disclosed to the downstream company. In other words, information on the added restricted substance is reported to the downstream company. Node 111-N may generate transaction data including information on the restricted substance for which approval for information disclosure has been obtained, and transmit the transaction data to the node of the downstream company of interest.

<Sequence Diagram>

Figure 7:
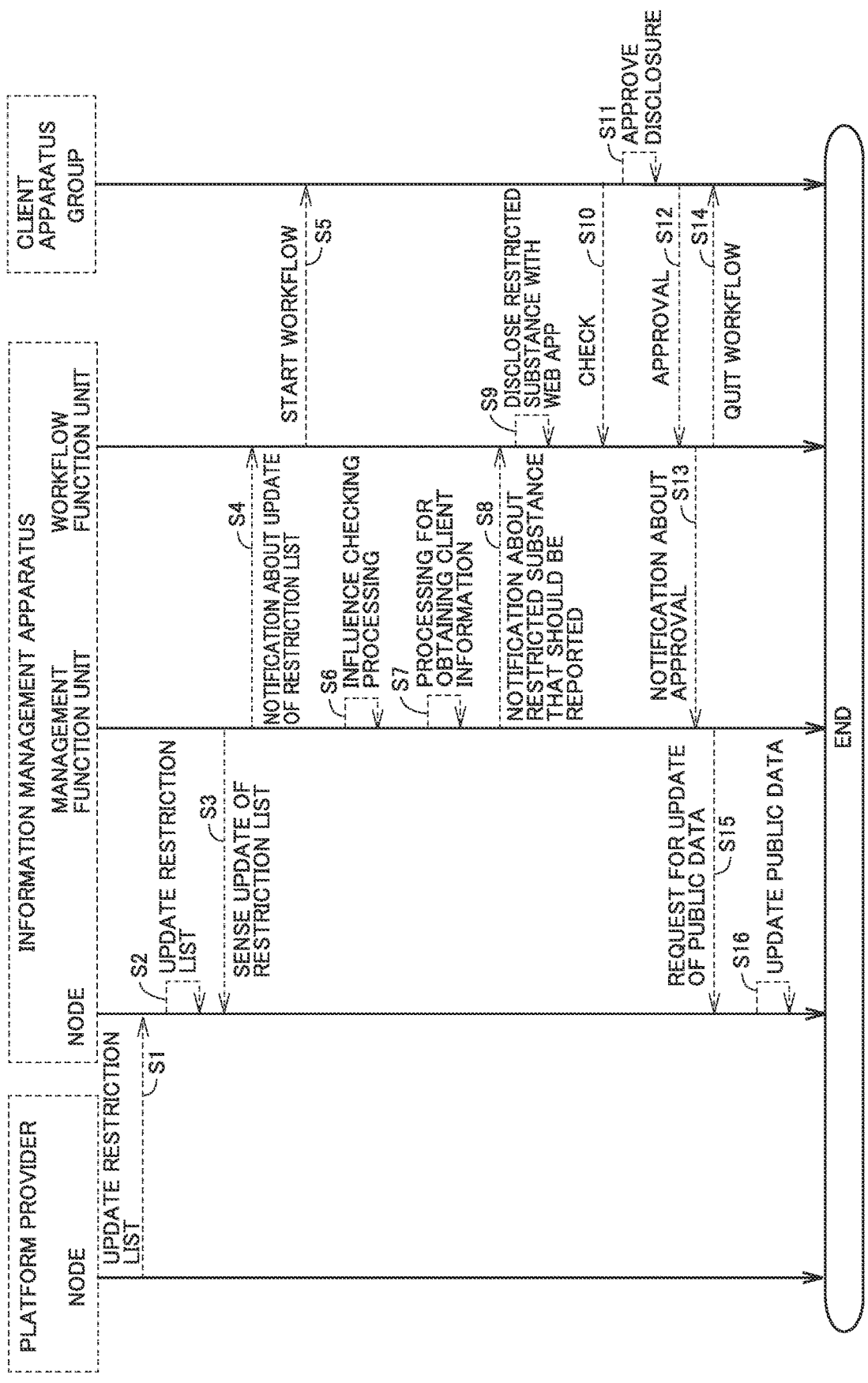
FIG. 7 is a sequence diagram showing a flow of processing performed at the time of update of a restriction list.

FIG. 7 is a sequence diagram showing a flow of processing performed at the time of update of the restriction list. Processing shown in this sequence diagram is started when node 41 of platform provider 30 senses designation of the new restricted substance as a result of revision of the laws and regulations (for example, designation of a new chemical substance as the SVHC and/or designation of a new chemical substance in the GADSL).

In S1, node 41 of platform provider 30 senses designation of a new restricted substance as a result of revision of the laws and regulations and updates restriction list 350. Node 41 of platform provider 30 transmits transaction data that proposes update of restriction lists 165-1 to 165-4 to respective nodes 111-1 to 111-4 of information management apparatuses 10-1 to 10-4.

In S2, node 111-N of information management apparatus 10-N approves the transaction data received from node 41 of platform provider 30 and updates restriction list 165-N.

In S3, management function unit 112-N of information management apparatus 10-N senses update of restriction list 165-N by node 111-N. Update of restriction list 165-N may be sensed by monitoring of restriction list 165-N by management function unit 112-N or by a notification indicating update of restriction list 165-N from node 41 to management function unit 112-N.

In S4, management function unit 112-N of information management apparatus 10-N notifies workflow function unit 113-N of update of restriction list 165-N.

In S5, workflow function unit 113-N of information management apparatus 10-N notifies the client apparatus group of start of the workflow. When each of the plurality of client apparatuses 12-N included in the client apparatus group receives the start notification, it refers to the web app every prescribed cycle.

In S6, management function unit 112-N of information management apparatus 10-N checks influence by update of restriction list 165-N. Specifically, management function unit 112-N of information management apparatus 10-N performs influence checking processing which is processing for checking whether or not information on the restricted substance added to restriction list 165-N should be disclosed to the downstream company. Management function unit 112-N of information management apparatus 10-N determines the content ratio in the company's product, of the restricted substance added to restriction list 165-N in accordance with product composition data 164-N, and checks whether or not the content ratio is equal to or more than the report threshold value. When the content ratio of the restricted substance is equal to or more than the report threshold value, management function unit 112-N of information management apparatus 10-N determines that the information on the restricted substance has to be disclosed to the downstream company and has the process proceed to S7. When the content ratio of the restricted substance is lower than the report threshold value, management function unit 112-N of information management apparatus 10-N determines that the information on the restricted substance does not have to be disclosed to the downstream company. In this case, management function unit 112-N of information management apparatus 10-N notifies workflow function unit 113-N that update of restriction list 165-N does not affect itself. Workflow function unit 113-N thus notifies the client apparatus group of end of the workflow.

In S7, management function unit 112-N of information management apparatus 10-N reads from storage 150-N, information (client information) on the downstream company to which a report is to be given. Specifically, management function unit 112-N of information management apparatus 10-N reads the client information by referring to client list 152-N stored in storage 150-N. In an example where node 111-N performs the function to perform S7, information similar to client list 152-N is stored in secret area 162-N in distributed ledger 161-N. Node 111-N reads the client information from secret area 162-N in distributed ledger 161-N.

In S8, management function unit 112-N of information management apparatus 10-N notifies workflow function unit 113-N of information on the restricted substance to be reported to the downstream company.

In S9, workflow function unit 113-N of information management apparatus 10-N discloses by means of the web app, information on the restricted substance (that is, the restricted substance newly designated as a result of revision of the laws and regulations) the notification about which was given in S8.

In S10, each of the plurality of client apparatuses 12-N refers to the web app and checks information on the added restricted substance.

In S11, client apparatus 12-N in the approval department that approves information disclosure in connection with the added restricted substance among the plurality of client apparatuses 12-N performs prescribed approval processing, and thereafter approves disclosure to the downstream company, of the information on the restricted substance disclosed on the web app.

In S12, client apparatus 12-N in the approval department notifies information management apparatus 10-N of approval of disclosure of the information on the restricted substance.

In S13, when workflow function unit 113-N of information management apparatus 10-N receives a notification about approval for disclosure of information on the restricted substance from client apparatus 12-N, it notifies management function unit 112-N of the approval.

In S14, workflow function unit 113-N of information management apparatus 10-N notifies the client apparatus group of end of the workflow. When each of the plurality of client apparatuses 12-N included in the client apparatus group receives the end notification, it quits reference to the web app.

In S15, management function unit 112-N of information management apparatus 10-N requests node 111-N to update public data 166-N.

In S16, node 111-N of information management apparatus 10-N adds information on the restricted substance for which approval for information disclosure has been obtained, and updates public data 166-N. Then, node 111-N generates transaction data including public data 166-N and transmits the transaction data to the node of the downstream company of interest. As the node of the downstream company approves the transaction data, public data 166-N is disclosed to the downstream company. In other words, information on the added restricted substance is disclosed to the downstream company. In S16, node 111-N may generate transaction data including information on the restricted substance for which approval for information disclosure has been obtained and may transmit the transaction data to the node of the downstream company of interest.

As set forth above, in information management system 1 according to the present embodiment, platform provider 30 monitors revision of the laws and regulations. Therefore, information management apparatus 10-N does not have to perform processing for monitoring revision of the laws and regulations. When a new restricted substance is designated as a result of revision of the laws and regulations, platform provider 30 adds the newly designated restricted substance to update restriction list 350. Then, platform provider 30 transmits to information management apparatus 10-N, transaction data that proposes addition of the newly designated restricted substance and update of restriction list 165-N. Restriction list 350 is thus updated and managed based on a result of monitoring of revision of the laws and regulations by platform provider 30, which is the manager of information management system 1. Consequently, high reliability of restriction list 350 can be maintained. Furthermore, the restriction lists (restriction lists 350 and 165-N) in information management system 1 are managed based on the distributed ledger technology. Therefore, tamper resistance of such restriction lists can be enhanced.

Since reliability and tamper resistance of restriction list 165-N are high, information management apparatus 10-N can save manual works such as checking of updated restriction list 165-N and contents of revision of the laws and regulations against each other. Information management apparatus 10-N can thus automatically extract the restricted substance to be disclosed to the downstream company from product composition data 164-N based on restriction list 165-N and disclose the extracted restricted substance. Therefore, man-hours and cost required in information management apparatus 10-N for monitoring of revision of the laws and regulations to update restriction list 165-N, manual selection of information to be disclosed based on restriction list 165-N, and checking as to whether or not disclosed information includes excessive information/whether or not information is missing can be reduced. Information management system 1 can thus readily address revision of the laws and regulations that regulate chemical substances.

[Modification]

In the embodiment, an example in which the web app is incorporated in information management apparatus 10-N and each of the plurality of client apparatuses 12-N uses the web app through the web browser to approve disclosure of information on the restricted substance is described. Each of the plurality of client apparatuses 12-N, however, should only be able to approve disclosure of information on the restricted substance, and the web app is not essential. In a modification, an example in which distributed ledger platform software is introduced also in each of the plurality of client apparatuses 12-N will be described.

Each of the plurality of client apparatuses 12-N functions as a node in distributed ledger network 2 by execution of distributed ledger platform software.

An approval map in which a chemical substance contained in a product and a department that approves disclosure (publication) are brought in correspondence with each other is stored in storage 160-N of information management apparatus 10-N. Specifically, the approval map is stored in secret area 162-N in storage 160-N. Node 111-N of information management apparatus 10-N refers to the approval map to specify the department that approves disclosure of information on the restricted substance added to restriction list 165-N. Then, node 111-N of information management apparatus 10-N transmits transaction data that requests approval for disclosure of information on the added restricted substance to the node of client apparatus 12-N in the approval department.

At the node of client apparatus 12-N, disclosure of information on the added restricted substance is approved automatically by means of an incorporated program or manually by a manager (employee) in the management department of client apparatus 12-N.

When node 111-N of information management apparatus 10-N obtains approval from the node of client apparatus 12-N, it updates public data 166-N. Thus, in the modification, node 111-N of information management apparatus 10-N performs also the function of workflow function unit 113-N.

As set forth above, an advantage as in the embodiment can be achieved also by introduction of distributed ledger platform software in each of the plurality of client apparatuses 12-N.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An information management system that manages information on a chemical substance contained in a product distributed in a supply chain based on a distributed ledger technology, the information management system comprising:

a management apparatus that manages the information management system, the management apparatus including a first distributed ledger including a list that shows a chemical substance managed in the information management system; and a first apparatus that belongs to a company included in the supply chain, the first apparatus including a second distributed ledger including the list, wherein the chemical substance included in the list refers to a chemical substance designated under laws and regulations, when a new chemical substance is designated under the laws and regulations, the management apparatus adds the designated chemical substance to the list in the first distributed ledger to update the list in the first distributed ledger, and the management apparatus transmits to the first apparatus, first transaction data that proposes addition of the designated chemical substance and update of the list in the second distributed ledger, and the first apparatus updates the list in the second distributed ledger based on the first transaction data, and transmits to a second apparatus that belongs to a downstream company in the supply chain, second transaction data including information on the designated chemical substance contained in a product supplied to the downstream company and included in the list in the second distributed ledger.

2. The information management system according to claim 1, wherein the management apparatus obtains information on the laws and regulations from an external apparatus that manages information on the laws and regulations.

3. The information management system according to claim 1, wherein the second apparatus includes a third distributed ledger, the second distributed ledger includes a secret area and a public area, the secret area is an area where transaction data not shared with the first distributed ledger and the third distributed ledger is stored, the public area is an area where transaction data shared with at least one of the first distributed ledger and the third distributed ledger is stored, in the first apparatus, composition data of the product supplied to the downstream company is stored in the secret area, and the first apparatus extracts from the composition data, the information on the designated chemical substance included in the list in the second distributed ledger, and transmits the second transaction data including the extracted information on the designated chemical substance to the second apparatus.

4. The information management system according to claim 1, wherein the first apparatus is configured to communicate with a plurality of terminal apparatuses, incorporates a web application accessible through a web browser, and discloses, when the list in the second distributed ledger is updated, the information on the designated chemical substance added to the list in the second distributed ledger, by using the web application, and each of the plurality of terminal apparatuses has approval authority for disclosure of information on at least any one chemical substance of chemical substances contained in the product supplied to the downstream company, and approves disclosure of the information on the at least any one chemical substance to the downstream company through the web browser.

5. The information management system according to claim 4, wherein the first apparatus transmits the second transaction data to the second apparatus after the first apparatus obtains approval from a terminal apparatus having the approval authority in connection with the designated chemical substance among the plurality of terminal apparatuses.

6. The information management system according to claim 1, wherein the first apparatus is configured to communicate with a plurality of terminal apparatuses, each of the plurality of terminal apparatuses has approval authority for disclosure of information on at least one chemical substance of chemical substances contained in the product supplied to the downstream company, and the first apparatus
includes a map showing correspondence between a chemical substance contained in the product supplied to the downstream company and the approval authority that each of the plurality of terminal apparatuses has, specifies based on the map, when the list in the second distributed ledger is updated, a terminal apparatus having the approval authority for disclosure of the information on the designated chemical substance added to the list in the second distributed ledger, and transmits to the specified terminal apparatus, third transaction data that indicates a request for approval for disclosure of information on the designated chemical substance added to the list in the second distributed ledger.

7. The information management system according to claim 6, wherein the specified terminal apparatus transmits to the first apparatus, fourth transaction data responding to the request.

8. An information management method in an information management system that manages information on a chemical substance contained in a product distributed in a supply chain based on a distributed ledger technology, the information management system including a management apparatus that manages the information management system, the management apparatus including a first distributed ledger including a list that shows a chemical substance managed in the information management system, and a first apparatus that belongs to a company included in the supply chain, the first apparatus including a second distributed ledger including the list, the chemical substance included in the list referring to a chemical substance designated under laws and regulations, the information management method comprising:

when a new chemical substance is designated under the laws and regulations, adding, by the management apparatus, the designated chemical substance to the list in the first distributed ledger to update the list in the first distributed ledger;

transmitting, by the management apparatus, to the first apparatus, first transaction data that proposes addition of the designated chemical substance and update of the list in the second distributed ledger;

updating, by the first apparatus, the list in the second distributed ledger based on the first transaction data; and transmitting, by the first apparatus, to a second apparatus that belongs to a downstream company in the supply chain, second transaction data including information on the designated chemical substance contained in a product supplied to the downstream company and included in the list in the second distributed ledger.

* * * * *